(12) United States Patent
Shin et al.

(10) Patent No.: US 7,274,984 B2
(45) Date of Patent: *Sep. 25, 2007

(54) VEHICLE STABILITY ENHANCEMENT SYSTEM

(75) Inventors: Kwang-Keun Shin, Rochester Hills, MI (US); Shih-Ken Chen, Troy, MI (US); William C Lin, Troy, MI (US)

(73) Assignee: General Motors Corporation, Detroit, MI (US)

( * ) Notice: Subject to any disclaimer, the term of this patent is extended or adjusted under 35 U.S.C. 154(b) by 277 days.

This patent is subject to a terminal disclaimer.

(21) Appl. No.: 10/868,696

(22) Filed: Jun. 14, 2004

(65) Prior Publication Data

US 2005/0278105 A1    Dec. 15, 2005

(51) Int. Cl.
*G06F 19/00* (2006.01)

(52) U.S. Cl. .................. 701/70; 701/84; 701/301; 340/438; 303/146; 477/107; 477/34

(58) Field of Classification Search .......... 701/70, 701/84, 301, 36; 340/903, 438; 303/146; 477/107, 34

See application file for complete search history.

(56) References Cited

U.S. PATENT DOCUMENTS

| | | |
|---|---|---|
| 3,688,188 A | 8/1972 | Bak et al. |
| 4,422,043 A | 12/1983 | Meador |
| 4,541,486 A | 9/1985 | Wetzel et al. |
| 4,783,995 A | 11/1988 | Michel et al. |
| 4,890,682 A | 1/1990 | Worrall et al. |
| 4,950,892 A | 8/1990 | Olesen |
| 4,972,906 A | 11/1990 | McDaniel |
| 5,026,141 A | 6/1991 | Griffiths |
| 5,181,565 A | 1/1993 | Czernickow |
| 5,243,562 A | 9/1993 | Laurent et al. |
| 5,247,156 A | 9/1993 | Favre |
| 5,302,894 A | 4/1994 | Hrubes |
| 5,309,405 A | 5/1994 | Brett et al. |
| 5,332,038 A | 7/1994 | Tapp et al. |
| 5,337,808 A | 8/1994 | Graham |
| 5,339,895 A | 8/1994 | Arterbury et al. |
| 5,355,720 A | 10/1994 | Bailey |

(Continued)

OTHER PUBLICATIONS

Dorgham, "International Journal o Vehicle Design", vol. 23, Nos. 1/2, 2000, pp. 136-149.

(Continued)

*Primary Examiner*—Thomas Black
*Assistant Examiner*—Marie A Weiskopf (57) ABSTRACT

A side-slip velocity estimation module for a vehicle stability enhancement control system includes a side-slip acceleration estimation module that estimates a side-slip acceleration of a vehicle. A multiple-order integrator integrates the side-slip acceleration to generate an estimated side-slip velocity of the vehicle. A reset logic module clears an output of the multiple-order integrator when the vehicle experiences a straight-driving condition, when a speed of the vehicle is less than a predetermined speed, and/or when a sensor bias condition occurs. The multiple-order integrator includes at least two accumulators and at least two feedback loops. The estimated side-slip velocity is a weighted sum of outputs of at least one of the at least two accumulators. A sum of the at least two feedback loops offsets the estimated side-slip acceleration.

26 Claims, 9 Drawing Sheets

U.S. PATENT DOCUMENTS

| | | | |
|---|---|---|---|
| 5,376,888 | A | 12/1994 | Hook |
| 5,420,517 | A | 5/1995 | Skaling et al. |
| 5,676,433 | A * | 10/1997 | Inagaki et al. ............. 303/146 |
| 5,720,533 | A | 2/1998 | Pastor et al. |
| 5,815,102 | A * | 9/1998 | Melanson ................. 341/143 |
| 5,931,887 | A | 8/1999 | Hac |
| 6,035,251 | A | 3/2000 | Hac et al. |
| 6,819,998 | B2 | 11/2004 | Lin et al. ...................... 701/70 |
| 6,856,886 | B1 * | 2/2005 | Chen et al. ................... 701/70 |
| 2004/0199321 | A1 * | 10/2004 | Lin et al. ...................... 701/70 |

OTHER PUBLICATIONS

Kin/Yano/Urabe, "Enhancements in vehicle stability and steerability with slip control", 2003 Society of Automotive Engineers of Japan, Inc. and Elsevier Science B.V., pp. 71-79.

Yih/Ryu/Gerdes, "Modification of vehicle handling characteristics via steer-by-wire", 2003 IEEE, Proceedings of the American Control Conference, pp. 2578-2583.

International Search Report for PCT/US05/17755 DATED Jan. 5, 2007 corresponding to this application.

* cited by examiner

VEHICLE STABILITY ENHANCEMENT SYSTEM

FIELD OF THE INVENTION

The present invention relates to vehicle control systems, and more particularly to vehicle stability enhancement control systems.

BACKGROUND OF THE INVENTION

There are two motions that take place when a vehicle turns. A first motion is a turning motion called yaw motion. Yaw motion takes place as the vehicle spins around an imaginary axis that is vertical to the ground. A second motion is a lateral sliding motion called side-slip motion. Depending on a speed of the vehicle, side-slip motion occurs in the same direction as a turn or in an opposite direction of the turn.

A command interpreter in a stability control system of a vehicle determines a desired yaw rate and a desired side-slip velocity for the vehicle based on speed and a position of a steering wheel. The desired yaw rate and side-slip velocity correspond with values that typically exist when a vehicle is traveling on a dry and clean surface. When an actual yaw rate and/or side-slip velocity of the vehicle significantly surpasses a desired value, a driver typically feels a loss of control of the vehicle. In this case, it is likely road conditions necessitate vehicle stability enhancement.

In one approach, a stability control system compares actual yaw rate and/or side-slip velocity measurements with desired yaw rate and/or side-slip velocity values. The stability control system takes corrective action when the actual measurements surpass the desired values by predetermined thresholds. For example, the stability control system may instruct one or more brake actuators to create a brake pressure difference across one or more axles of the vehicle to create a yaw moment that stabilizes the vehicle. The stability control system may also instruct a rear-wheel steering actuator to turn a set of rear wheels of the vehicle to create the yaw moment.

Commercially available yaw rate sensors measure a yaw rate of a vehicle. Side-slip velocity sensors measure a side-slip velocity of a vehicle. However, side-slip velocity sensors are very expensive. Side-slip velocity may be determined based on a side-slip acceleration of a vehicle. For example, side-slip acceleration may be estimated based on a lateral acceleration, yaw rate, and speed of a vehicle. Ideally, side-slip velocity may be obtained by integrating side-slip acceleration. However, sensor bias always exists in sensors such as yaw rate sensors and lateral accelerometers. Therefore, the integration drifts because the unwanted bias signal is also integrated.

In one approach, a dynamic observer captures an estimated state of dynamics for a vehicle. An estimated side-slip velocity is generated based on the estimated state of dynamics. However, the estimation is based on vehicle cornering compliances, which are variable vehicle parameters. Cornering compliances vary greatly and depend on the type of surface that the vehicle is operating on. Therefore, the estimation is not accurate.

In another approach, global positioning system (GPS) sensors detect a position of a vehicle. Side-slip velocity is estimated based on data from the GPS sensors. However, GPS sensors are very expensive.

SUMMARY OF THE INVENTION

A side-slip velocity estimation module for a vehicle stability enhancement control system according to the present invention includes a side-slip acceleration estimation module that estimates a side-slip acceleration of a vehicle. A multiple-order integrator integrates the side-slip acceleration to generate an estimated side-slip velocity of the vehicle. A reset logic module clears an output of the multiple-order integrator when a first condition occurs.

In other features, the side-slip acceleration estimation module estimates the side-slip acceleration based on a yaw rate, a lateral acceleration, and a speed of the vehicle. The reset logic module clears the output when the vehicle experiences a straight-driving condition. The reset logic module detects the straight-driving condition based on a yaw rate, a lateral acceleration, and an angle of a steering wheel of the vehicle. The reset logic module clears the output when a speed of the vehicle is less than a predetermined speed. The reset logic module clears the output when a speed of the vehicle is greater than a predetermined speed, the vehicle does not experience a straight-driving condition, and the side-slip acceleration is less than a predetermined side-slip acceleration for a predetermined time period.

In still other features of the invention, the multiple-order integrator includes at least two accumulators and at least two feedback loops. The estimated side-slip velocity is a weighted sum of outputs of at least one of the at least two accumulators. A sum of the at least two feedback loops offsets the estimated side-slip acceleration.

In yet other features, a command interpreter generates an optimal side-slip velocity and an optimal yaw rate of the vehicle based on a position of a steering wheel of the vehicle and a speed of the vehicle. A side-slip velocity control module compares the optimal side-slip velocity and the estimated side-slip velocity to generate a side-slip control signal. A yaw rate control module compares the optimal yaw rate and a measured yaw rate of the vehicle to generate a yaw control signal. A summing module sums the yaw control signal and the side-slip control signal to generate an actuator control signal. At least one brake actuator of the vehicle applies a brake pressure difference across at least one axle of the vehicle to create a yaw moment that corrects a dynamic behavior of the vehicle based on the actuator control signal. A rear-wheel steering actuator turns a set of rear wheels of the vehicle to create a yaw moment that corrects a dynamic behavior of the vehicle based on the actuator control signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, or other suitable components that provide the described functionality.

Figure 1:
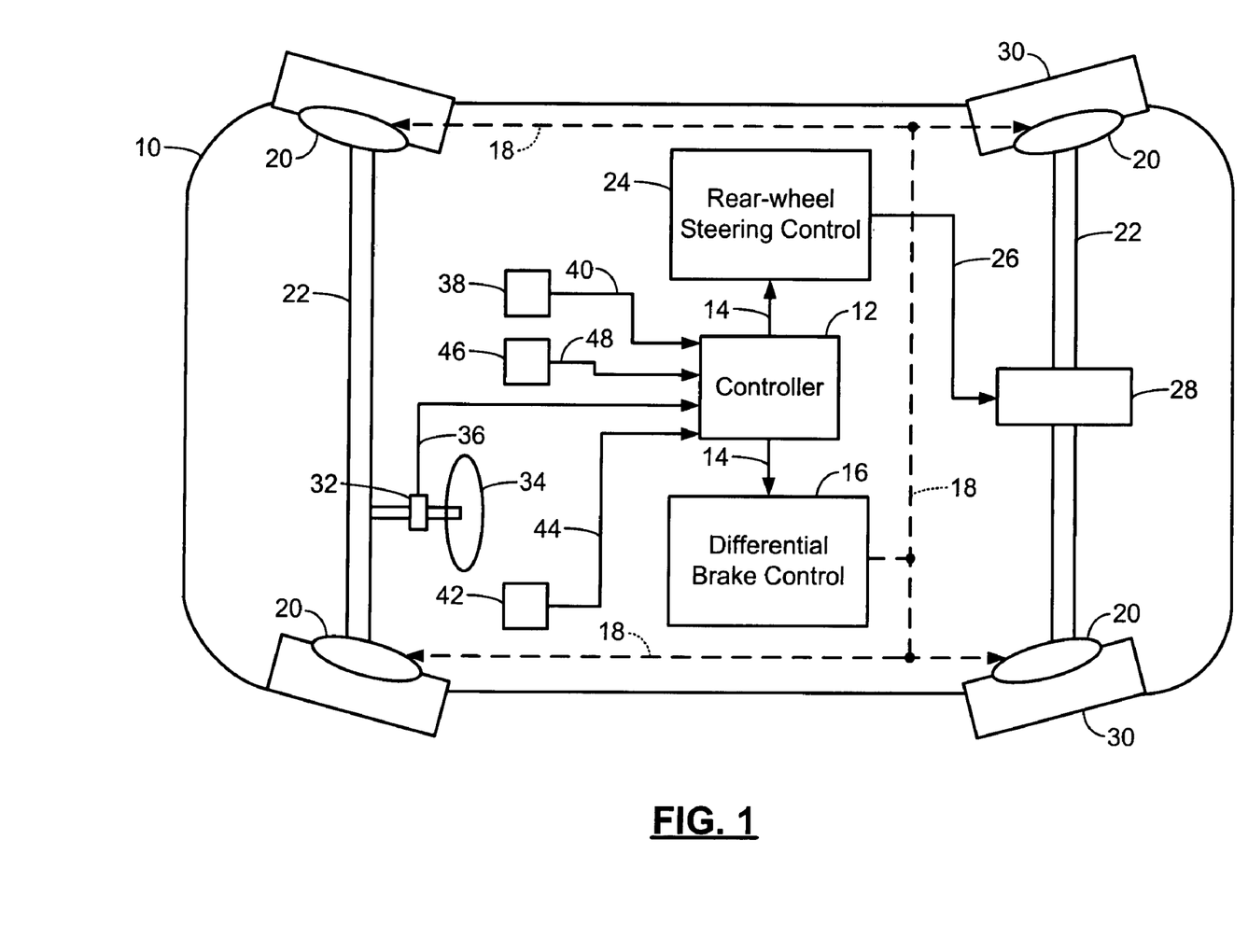
FIG. 1 illustrates a vehicle that includes rear-wheel steering control and differential braking control based on vehicle sensors according to the present invention.

Referring to FIG. 1, a vehicle 10 includes rear-wheel steering and differential braking as part of a vehicle stability enhancement control system. To implement differential braking, a controller 12 sends an actuator control signal 14 to a differential brake control module 16. The differential brake control module 16 sends a brake control signal 18 to one or more brake actuators 20. The brake control signal 18 instructs the brake actuators 20 to create a brake pressure difference across at least one of the axles 22 of the vehicle 10. The brake pressure difference creates a yaw moment to correct a dynamic behavior of the vehicle 10. For example, the controller 12 may instruct the differential brake control module 16 to create a yaw moment when there is a significant discrepancy between a desired yaw rate and a measured yaw rate and/or a desired side-slip velocity and measured side-slip velocity of the vehicle 10.

To implement rear-wheel steering, the controller 12 sends the actuator control signal 14 to a rear-wheel steering control module 24. The rear-wheel steering control module 24 sends a steering control signal 26 to a rear-wheel steering actuator 28. The rear-wheel steering actuator 28 turns a set of rear wheels 30 of the vehicle 10 to create a yaw moment to correct the dynamic behavior of the vehicle 10. While the vehicle stability enhancement system that is illustrated in FIG. 1 implements both differential braking and rear-wheel steering, either system alone or other methods may be used for vehicle stability enhancement.

Whether differential braking and/or rear-wheel steering are implemented, the controller 12 receives information about the operating conditions of the vehicle 10 from sensors. A steering wheel angle sensor 32 detects the position of a steering wheel 34 of the vehicle 10 and sends a steering wheel angle signal 36 to the controller 12. A speed sensor 38 detects the speed of the vehicle 10 and sends a speed signal 40 to the controller 12. For example, the speed sensor 38 may detect the speed of an output shaft on an engine of the vehicle 10. A lateral accelerometer 42 detects the lateral acceleration of the vehicle 10 and sends a lateral acceleration signal 44 to the controller 12. A yaw rate sensor 46 detects a yaw rate of the vehicle 10 and sends a yaw rate signal 48 to the controller 12. Those skilled in the art can appreciate that the controller 12 may be an independent controller or part of a vehicle computer. Additionally, the rear-wheel steering control module 24 and the differential brake control module 16 may be integrated into the controller 12.

Figure 2:
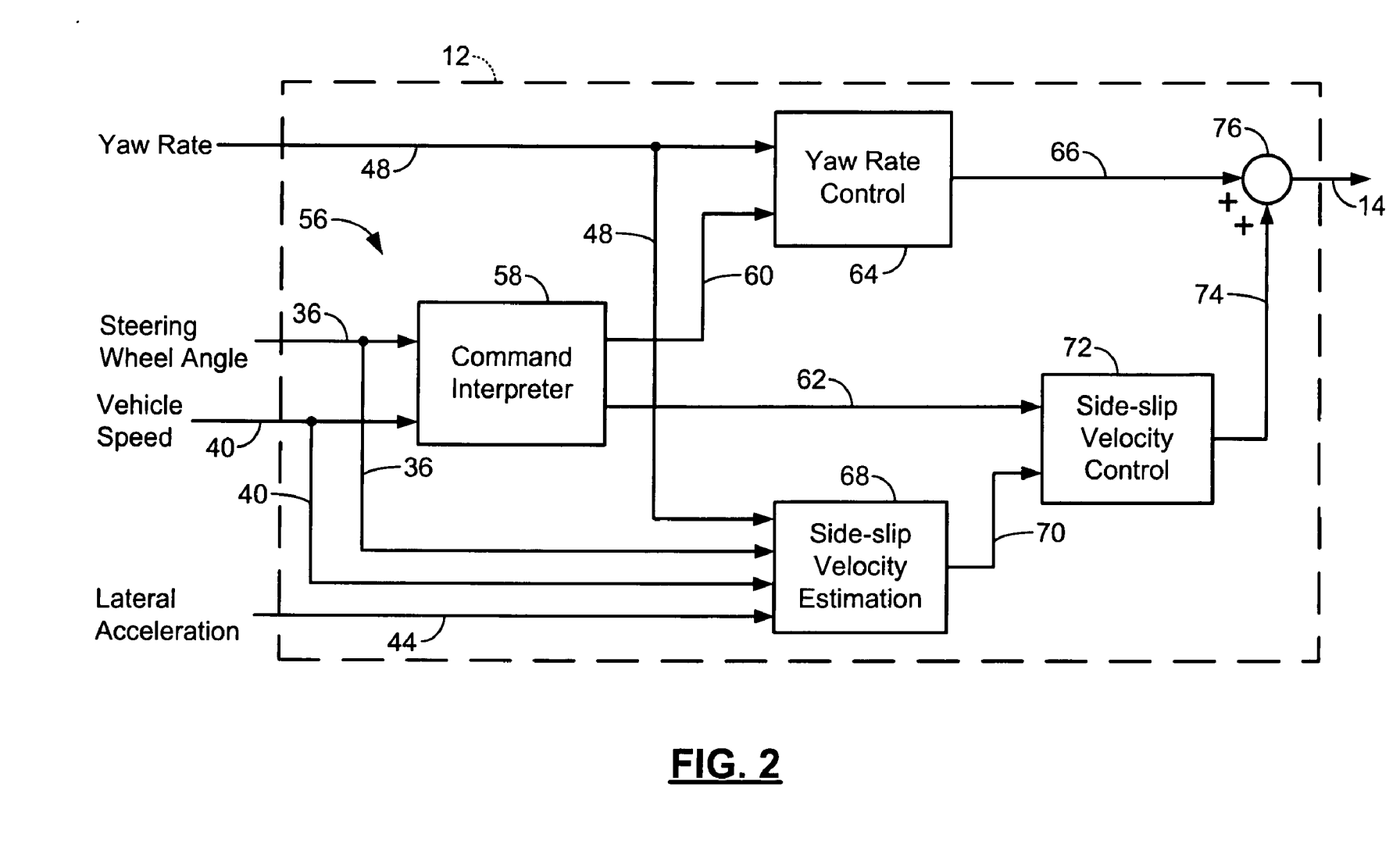
FIG. 2 is a functional block diagram of a vehicle stability enhancement control system according to the present invention.

Referring now to FIG. 2, the controller 12 implements a vehicle stability enhancement control system 56 that includes a command interpreter 58. The command interpreter 58 generates a desired yaw rate signal 60 and a desired side-slip velocity signal 62 based on the steering wheel angle signal 36 and the speed signal 40. When the values of the desired yaw rate signal 60 and/or the desired side-slip velocity signal 62 surpass predetermined thresholds, a driver typically feels a loss of control of the vehicle 10 and/or it is likely that road conditions necessitate vehicle stability enhancement. For example, the predetermined thresholds may vary depending on the speed of the vehicle 10.

A yaw rate control module 64 generates a yaw rate control signal 66 by comparing the yaw rate signal 48 and the desired yaw rate signal 60. A side-slip velocity estimation module 68 generates an estimated side-slip velocity signal 70 based on the steering wheel angle signal 36, the speed signal 40, and the lateral acceleration signal 44. A side-slip velocity control module 72 generates a side-slip velocity control signal 74 by comparing the desired side-slip velocity signal 62 and the estimated side-slip velocity signal 70. A summing module 76 sums the yaw rate control signal 66 and the side-slip velocity control signal 74 to generate the actuator control signal 14. The actuator control signal 14 instructs the differential brake control module 16 and/or the rear-wheel steering control module 24 to create a corrective yaw moment to correct the dynamic behavior of the vehicle 10.

Figure 3:
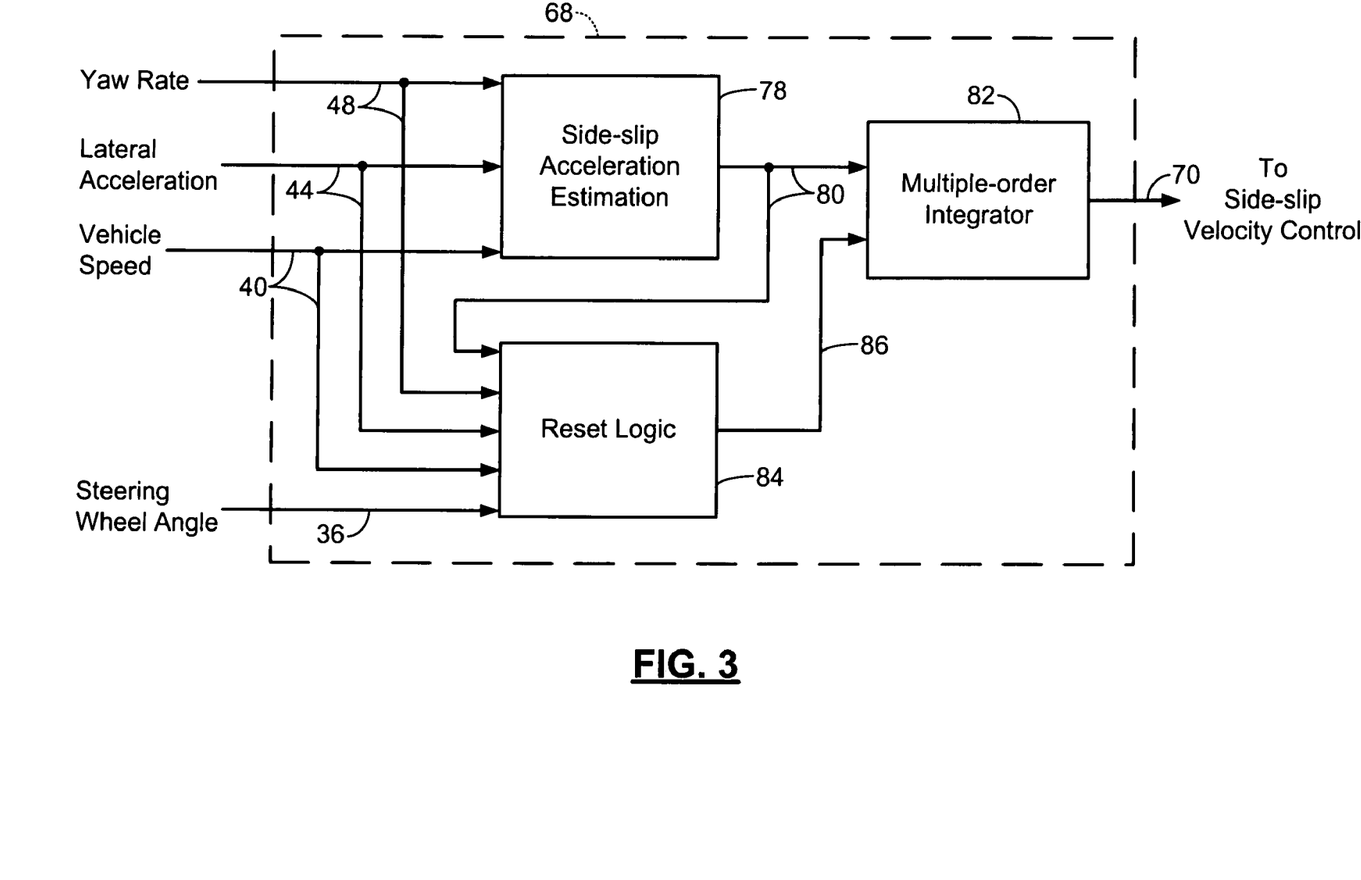
FIG. 3 is a functional block diagram of the side-slip velocity estimation module of FIG. 2.

Referring now to FIG. 3, the side-slip velocity estimation module 68 includes a side-slip acceleration estimation module 78. The side-slip acceleration estimation module 78 generates an estimated side-slip acceleration signal 80 based on the yaw rate signal 48, lateral acceleration signal 44, and the speed signal 40. The estimated side-slip acceleration signal 80 is the integrand of an integration module 82. The integration module 82 integrates the estimated side-slip acceleration signal 80 to generate the estimated side-slip velocity signal 70. A reset logic module 84 generates a reset signal 86 based on the estimated side-slip acceleration signal 80, the yaw rate signal 48, the lateral acceleration signal 44, the speed signal 40, and the steering wheel angle signal 36.

The integration module 82 preferably includes a multiple-order integrator that is resettable. A resettable integrator functions as a typical integrator by accumulating the values of the integrand when a reset command is inactive (or FALSE). The resultant integral is cleared to zero when the reset command is active (or TRUE). If the sensors used to estimate side-slip acceleration were ideal, there would be no need to reset the integrator or limit its input frequency range. Side-slip velocity is mathematically the integration of side-slip acceleration. However, practically all sensors have sensor bias and signals from the sensors drift. Without resetting an integrator or limiting its input frequency, the integrator continues to accumulate the bias signals, which reduces the accuracy of the signal.

Ideally, the bias components may be estimated and removed before the integration process. However, a bias removal process is very difficult. Although the bias components are not removed or blocked off completely when the reset command is inactive, any accumulation during a very short period of time is not significant enough to cause adverse effects in the control system. Therefore, the integration module 82 reduces the effect of steady-state or near-steady-state sensor bias.

An input of the integration module 82 receives the reset signal 86 and clears the estimated side-slip velocity signal 70 when the reset signal 86 is TRUE. The reset signal 86 is TRUE when the existing vehicle motion does not require vehicle stability enhancement. The estimated side-slip velocity signal 70 is the integral of the estimated side-slip acceleration signal 80 when the reset signal 86 is FALSE. The reset signal 86 is FALSE when the existing vehicle motion requires vehicle stability enhancement.

Figure 4:
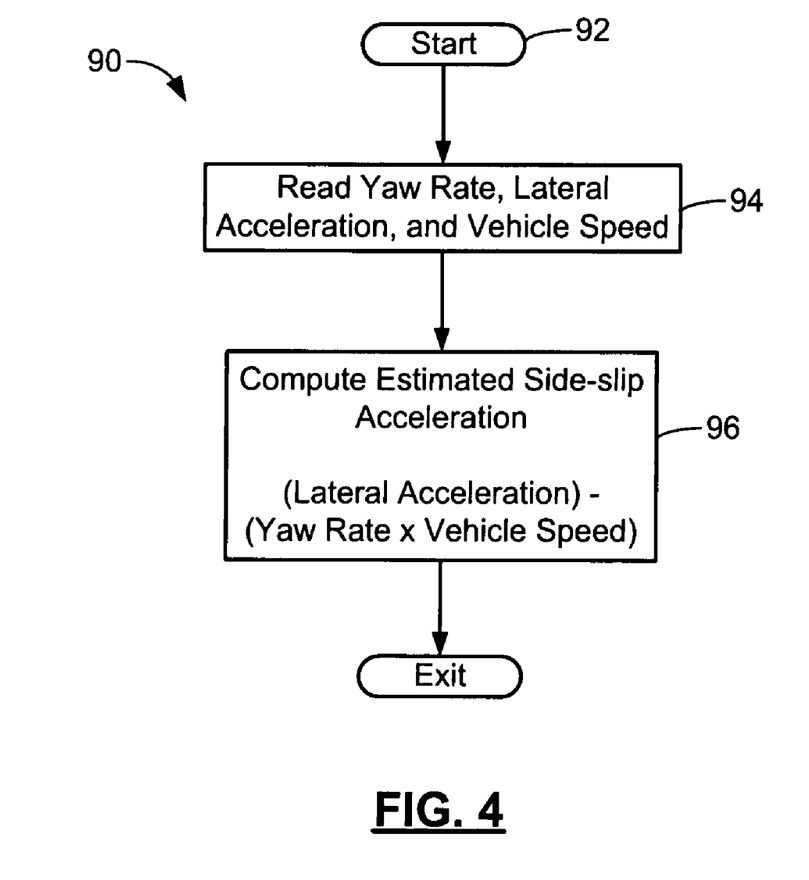
FIG. 4 is a flowchart illustrating steps performed by the side-slip acceleration estimation module of FIG. 3.

Referring now to FIG. 4, a side-slip acceleration estimation algorithm 90 begins in step 92. The side-slip acceleration estimation module 78 estimates side-slip acceleration based on the values of the yaw rate signal 48, the lateral acceleration signal 44, and the speed signal 40. In step 94, the controller 12 reads the current value of the yaw rate signal 48, the lateral acceleration signal 44, and the speed signal 40. In step 96, control computes an estimated side-slip acceleration by subtracting the product of yaw rate and speed from lateral acceleration and control ends. The result is the value of the estimated side-slip acceleration signal 80.

Figures 5A, 5B:
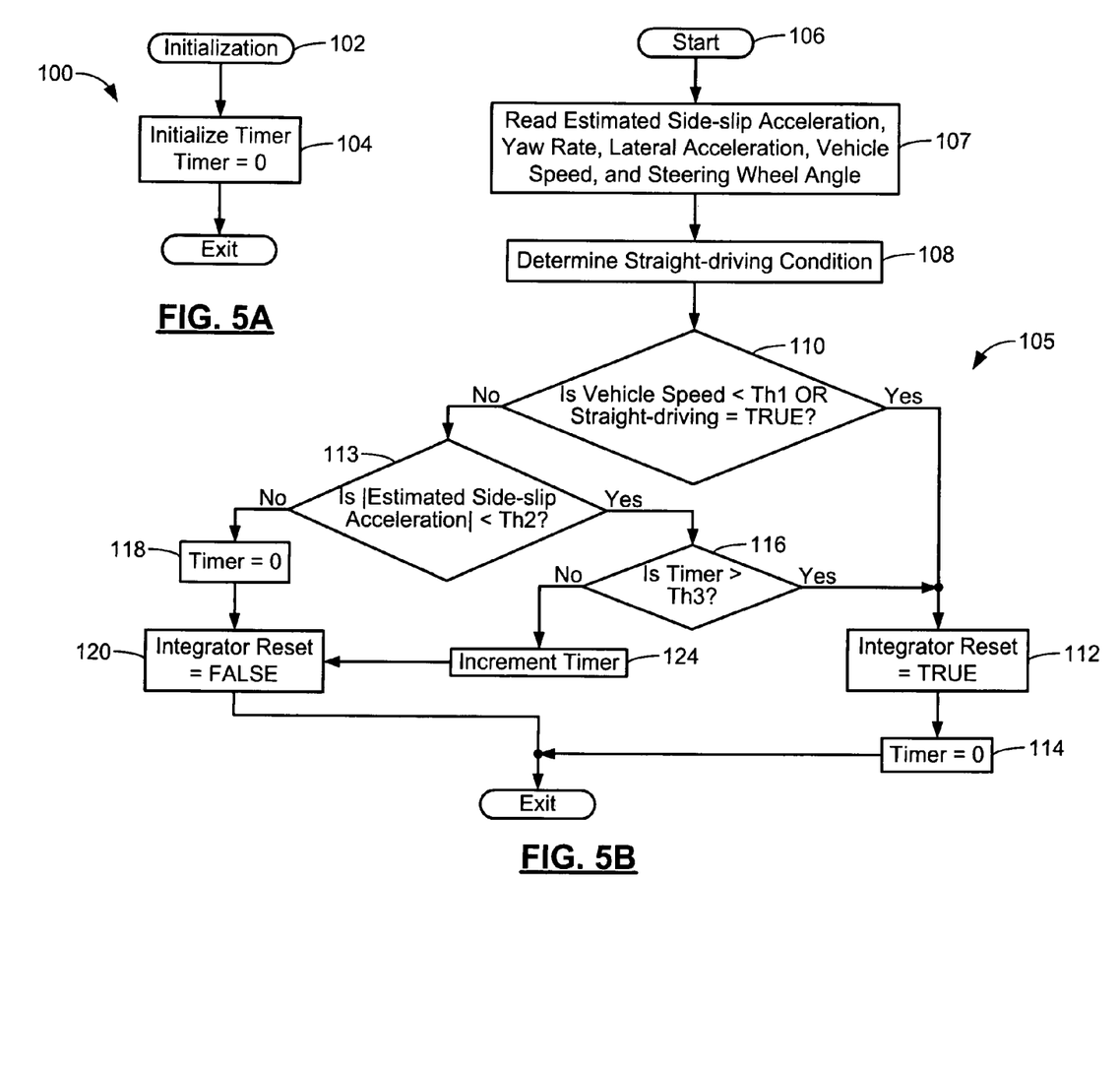
FIG. 5A is a flowchart illustrating initialization steps performed by the reset logic module of FIG. 3.
FIG. 5B is a flowchart illustrating post-initialization steps performed by the reset logic module of FIG. 3.

Referring now to FIGS. 5A and 5B, an integrator reset initialization 100 begins in step 102. In step 104, a timer is initialized and set to zero and control ends. Step 104 is preferably performed before the reset logic module 84 is executed for the first time after the vehicle 10 is turned on. An integrator reset algorithm 105 begins in step 106. In step 107, the controller 12 reads the current values of the estimated side-slip acceleration signal 80, the yaw rate signal 48, the speed signal 40, and the steering wheel angle signal 36. In step 108, the controller 12 determines a straight-driving condition that indicates whether the vehicle 10 is turning or traveling in a relatively straight path.

In step 110, control determines whether the vehicle speed is below a predetermined speed or the straight-driving condition is TRUE. If true, control proceeds to step 112. If false, control proceeds to step 113. In step 112, the reset signal 86 is set to TRUE and the output of the integration module 82 is cleared. In step 114, the controller 12 resets the timer to zero and control ends. The fact that the vehicle 10 is not turning and/or is traveling below a predetermined speed, 10 miles per hour for example, indicates that there is no potential need for vehicle stability enhancement.

In step 113, control determines whether an absolute value of the estimated side-slip acceleration is less than a predetermined side-slip acceleration, 0.02 g for example. If true, control proceeds to step 116. If false, control proceeds to step 118. When the estimated side-slip acceleration is above the predetermined side-slip acceleration, it is likely that the value of the estimated side-slip acceleration signal 80 is caused by genuine vehicle motion and not sensor bias. In step 118, the timer is reset to zero. In step 120 the reset signal 86 is set to FALSE and control ends. When the reset signal 86 is set to FALSE, the output of the integration module 82 is the estimated side-slip velocity.

In step 116, control determines whether a value of the timer is greater than a predetermined value, 2 seconds for example. If true, control proceeds to step 112. If false, control proceeds to step 124. In step 124, control increments the timer and control proceeds to step 120. When the absolute value of the estimated side-slip acceleration is below the predetermined side-slip acceleration and the timer is above the predetermined value, it is likely that the value of the estimated side-slip acceleration signal is actually caused by sensor bias and not genuine vehicle motion.

Figure 6:
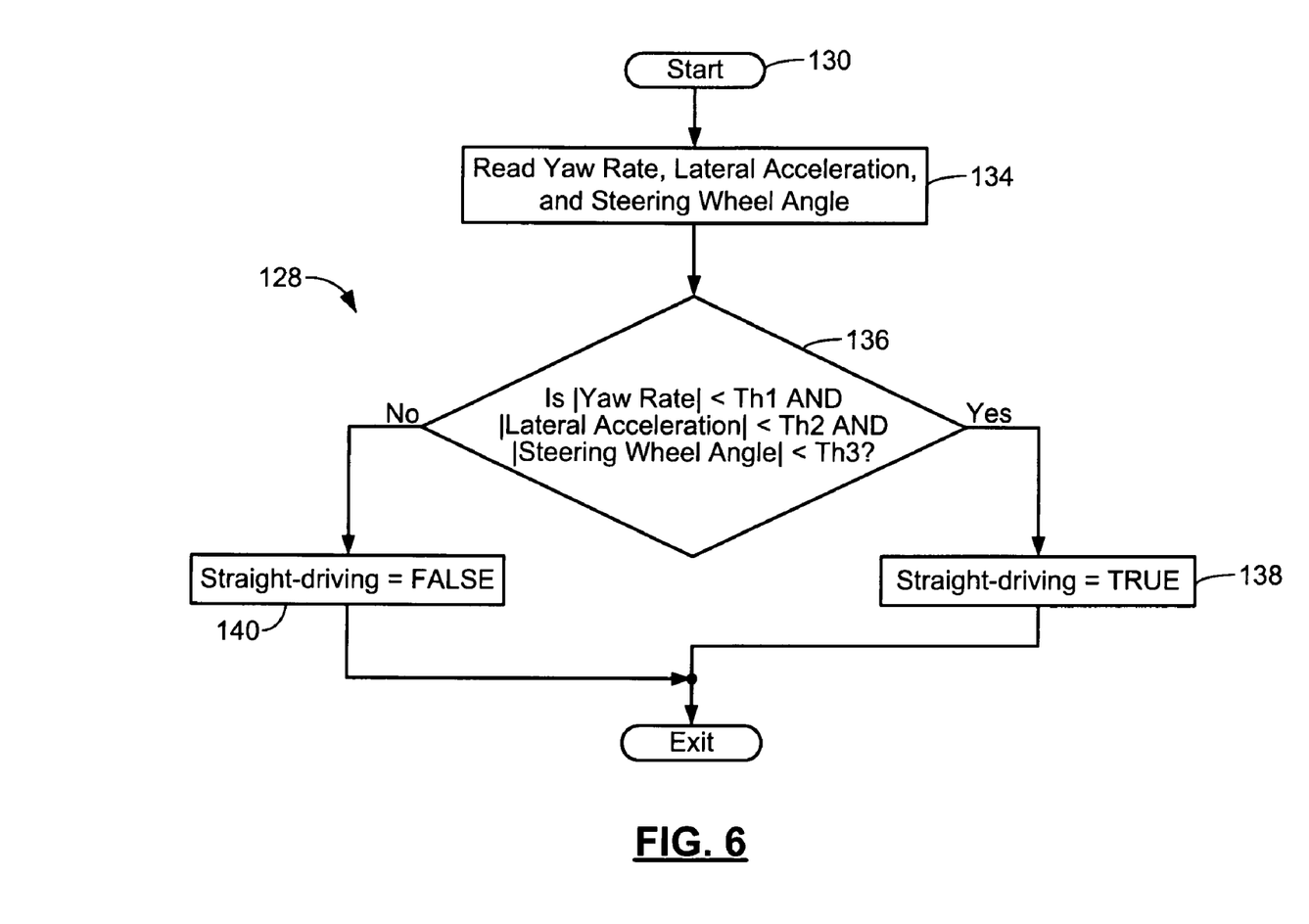
FIG. 6 is a flowchart illustrating steps performed by the reset logic module of FIG. 3 to determine a straight-driving condition.

Referring now to FIG. 6, a straight-driving algorithm 128 begins in step 130. In step 134, the controller 12 reads the current values from the yaw rate signal 48, the lateral acceleration signal 44, and the steering wheel angle signal 36. In step 136, control determines whether an absolute value of the yaw rate is less than a predetermined yaw rate, an absolute value of the lateral acceleration is less than a predetermined lateral acceleration, and an absolute value of the steering wheel angle is less than a predetermined steering wheel angle. If true, control proceeds to step 138. If false, control proceeds to step 140. In step 138, control sets the straight-driving condition to TRUE and control ends. In step 140, control sets the straight-driving condition to FALSE and control ends.

Figure 7A:
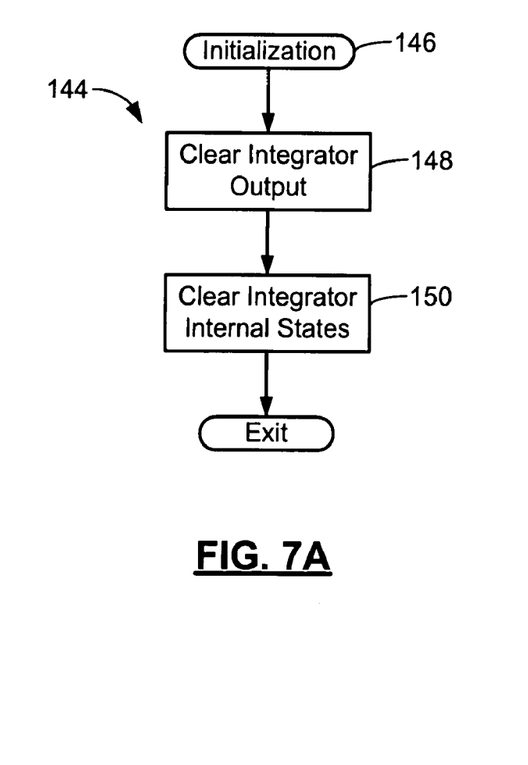
FIG. 7A is a flowchart illustrating initialization steps performed by the integration module of FIG. 3.
Figure 7B:
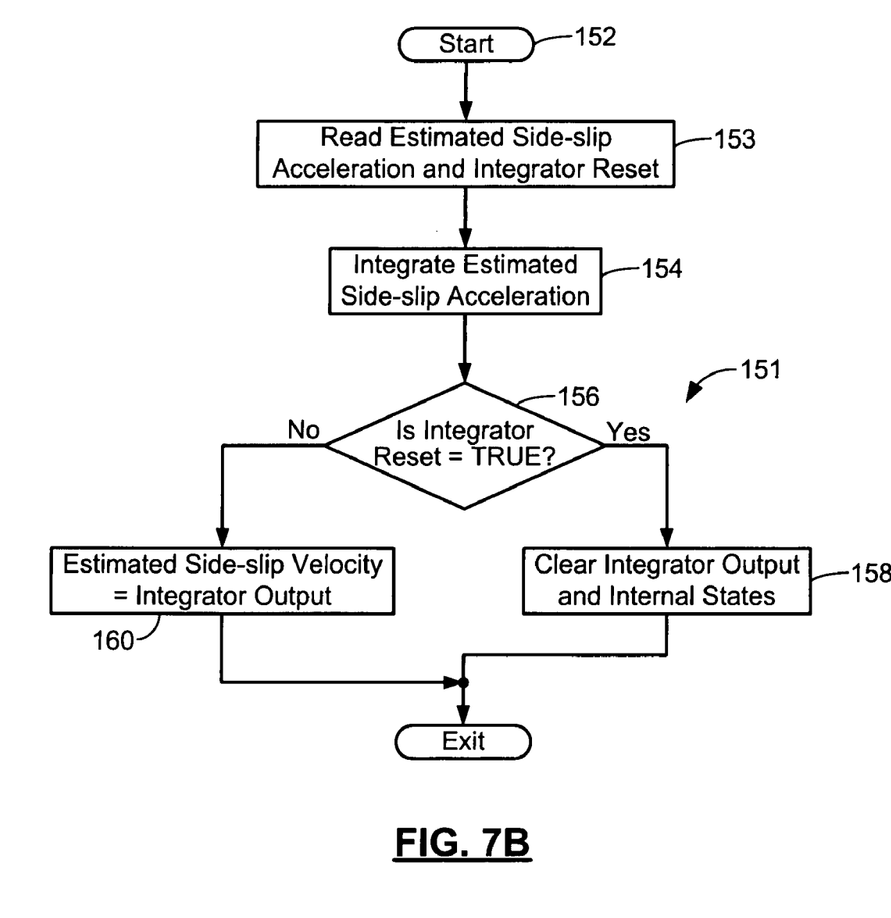
FIG. 7B is a flowchart illustrating post-initialization steps performed by the integration module of FIG. 3.

Referring now to FIGS. 7A and 7B, an integration initialization 144 begins in step 146. In step 148, the output of the integration module 82 is cleared. In step 150, the internal states of the integration module 82 are cleared and control ends. Steps 148 and 150 are preferably performed before the integration module 82 is executed for the first time after the vehicle 10 is turned on. An integration algorithm 151 begins in step 152. In step 153, control reads the current values of the estimated side-slip acceleration signal 80 and the reset signal 86. In step 154, the integration module 82 integrates the estimated side-slip acceleration.

In step 156, control determines whether the reset signal is set to TRUE. If true, control proceeds to step 158. If false, control proceeds to step 160. In step 158, the integration module 82 clears the output and internal states of the integration module 82 and control ends. In step 160, the integration module 82 outputs the estimated side-slip velocity signal 70 and control ends.

Figure 8:
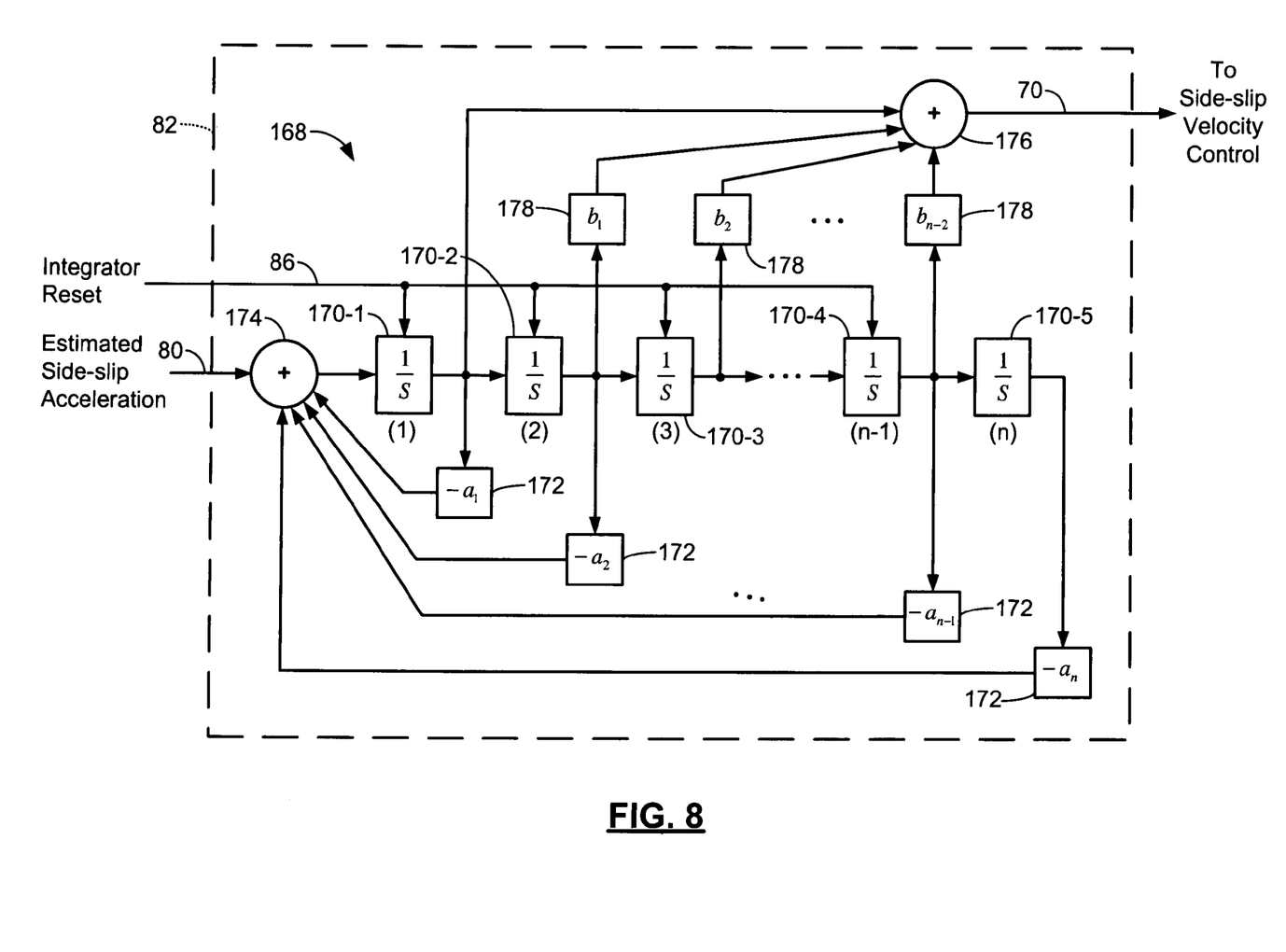
FIG. 8 is a functional block diagram of a multiple-order integrator that generates an estimated side-slip velocity.

Referring now to FIG. 8, the integration module 82 includes a multiple-order integrator 168. The multiple-order integrator 168 includes a series of accumulators 170. If all of the sensors in the vehicle stability enhancement control system were ideal sensors, only a first-order integrator would be required. In that case, either sensor bias would not exist, or the bias components would be defined by a quantifiable ratio that could be removed. Since the sensors are non-ideal, less certainty exists as to the magnitude of sensor bias components. Therefore, multiple stages are required to minimize the adverse effects of sensor bias.

Outputs of the accumulators 170 are multiplied by feedback gains 172 and summed at a first summing module 174 to generate a feedback sum. An input of the first summing module 174 receives the estimated side-slip acceleration signal 80. The value of the estimated side-slip acceleration signal 80 is offset by the feedback sum. During stead-state conditions, the value of the feedback sum is zero, and the value of the estimated side-slip acceleration signal 80 is unaffected. The outputs of all of the accumulators 170 except for the last accumulator 170-5 are also summed at a second summing module 176 to generate a weighted sum.

Of the signals that are summed at the second summing module 176, all but the signal from the output of the first accumulator 170-1 are multiplied by weighting factors 178. The feedback gains 172 and weighting factors 178 adjust how fast the multiple-order integrator 168 converts error signals to zero. Therefore, the multiple-order integrator responds to subtle changes in the estimated side-slip acceleration signal 80 that may be caused by sensor bias and takes corrective action. The weighted sum is the estimated side-slip velocity signal 70. Inputs of all of the accumulators 170 except for the last accumulator 170-5 receive the rest signal 86. When the integrator reset signal 86 is set to TRUE, the outputs of the accumulators 170 that receive the reset signal 86 are cleared. Otherwise, the accumulators 170 function normally. Since the last accumulator 170-5 estimates sensor bias, the last accumulator 170-5 does not receive the reset signal 86.

While the multiple-order integrator 168 in FIG. 8 significantly reduces adverse affects due to sensor bias components, the integration module 82 may also include a high pass filter before the first summing module. Sensor bias is typically a steady-state or a near-steady-state condition with a near-zero frequency. Therefore, a high pass filter ensures that frequencies below a predetermined frequency are not integrated. For example, a high pass filter may filter out signals with frequencies below 0.05 Hz.

Figure 9:
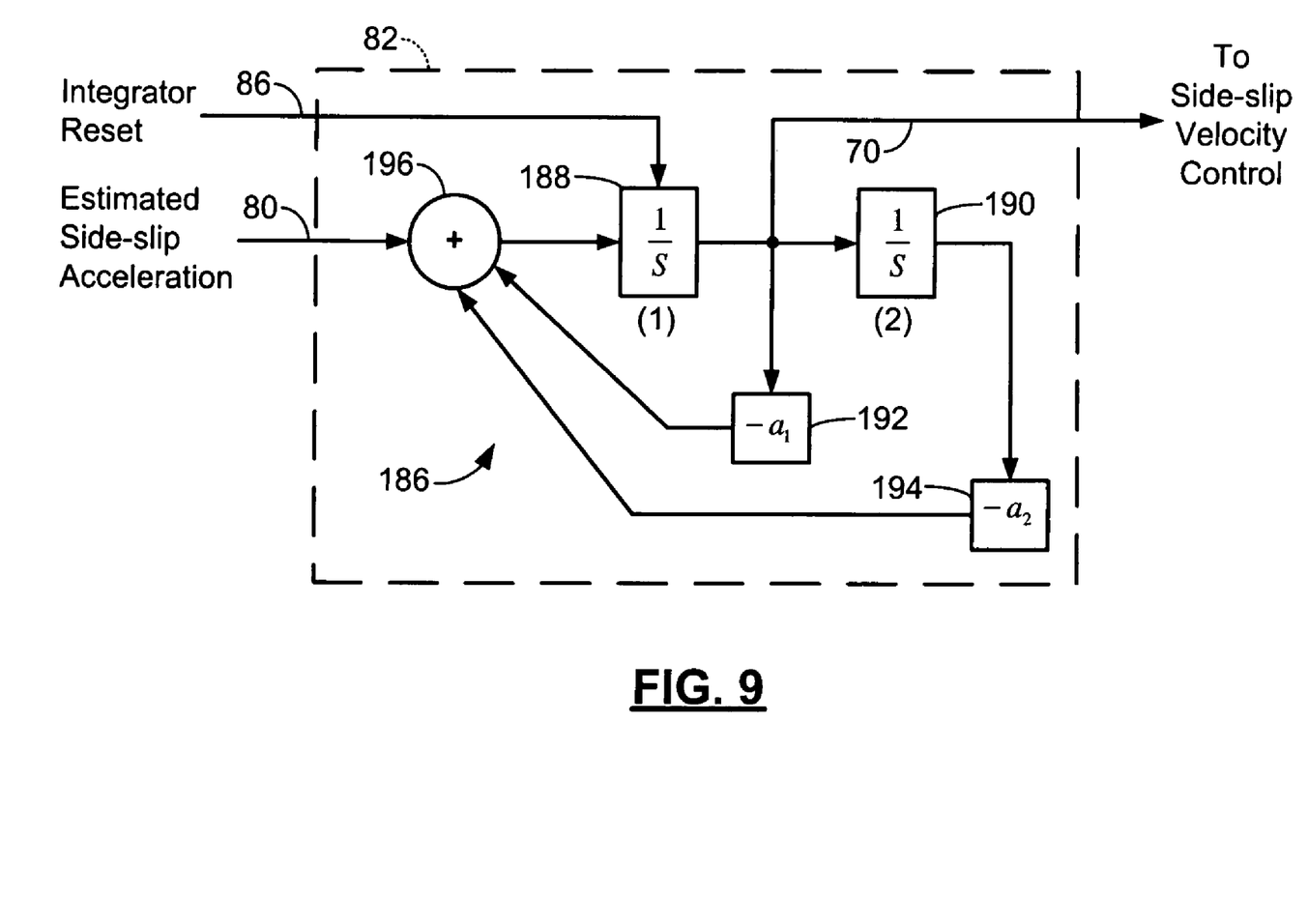
FIG. 9 is a functional block diagram of a second-order integrator that generates an estimated side-slip velocity.

Referring now to FIG. 9, the integration module 82 includes an exemplary second-order integrator 186. The second-order integrator 186 includes first and second accumulators 188 and 190, respectively. Outputs of the first and second accumulators 188 and 190, respectively, are multiplied by first and second feedback gains 192 and 194, respectively, and summed by a summing module 196 to generate an offset sum. Coefficients of the first and second feedback gains, $a_1$ and $a_2$, 192 and 194, respectively, are determined by a natural frequency and a damping ratio. For example, the natural frequency may be 0.001 Hz and the damping ratio may be 1.0.

An input of the summing module 196 receives the estimated side-slip acceleration signal 80. The value of the estimated side-slip acceleration signal 80 is offset by the feedback sum. The output of the first accumulator 188 is the estimated side-slip velocity signal 70. An input of the first accumulator 188 receives the reset signal 86. The output of the first accumulator 188 is cleared when the reset signal 86 is set to TRUE. Otherwise, the first accumulator 188 functions normally.

The vehicle stability enhancement control system of the present invention provides for a more accurate estimation of vehicle side-slip velocity. This is achieved with little software overhead and without additional hardware costs over and above the existing state-of-the-art stability enhancement systems. Side-slip velocity estimation errors caused by sensor bias are avoided and very expensive sensors are not required. The present invention may also be implemented as a feature that a driver may disable. For example, an expert driver can typically outperform a vehicle stability enhancement system.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A side-slip velocity estimation module for a vehicle stability enhancement control system, comprising:
a side-slip acceleration estimation module that estimates a side-slip acceleration of a vehicle;
a multiple-order integrator that integrates said side-slip acceleration to generate an estimated side-slip velocity of said vehicle; and
a reset logic module that clears an output of said multiple-order integrator when a first condition occurs.

2. The side-slip velocity estimation module of claim 1 wherein said side-slip acceleration estimation module estimates said side-slip acceleration based on a yaw rate, a lateral acceleration, and a speed of said vehicle.

3. The side-slip velocity estimation module of claim 1 wherein said reset logic module clears said output when said vehicle experiences a straight-driving condition.

4. The side-slip velocity estimation module of claim 3 wherein said reset logic module detects said straight-driving condition based on a yaw rate, a lateral acceleration, and an angle of a steering wheel of said vehicle.

5. The side-slip velocity estimation module of claim 1 wherein said reset logic module clears said output when a speed of said vehicle is less than a predetermined speed.

6. The side-slip velocity estimation module of claim 1 wherein said reset logic module clears said output when a speed of said vehicle is greater than a predetermined speed, said vehicle does not experience a straight-driving condition, and said side-slip acceleration is less than a predetermined side-slip acceleration for a predetermined time period.

7. The side-slip velocity estimation module of claim 1 wherein said multiple-order integrator includes at least two accumulators and at least two feedback loops.

8. The side-slip velocity estimation module of claim 7 wherein said estimated side-slip velocity is a weighted sum of outputs of at least one of said at least two accumulators.

9. The side-slip velocity estimation module of claim 7 wherein a sum of said at least two feedback loops offsets said estimated side-slip acceleration.

10. A system that includes the side-slip velocity estimation module of claim 1 further comprising:
a command interpreter that generates an optimal side-slip velocity of said vehicle based on a position of a steering wheel of said vehicle and a speed of said vehicle; and
a side-slip velocity control module that compares said optimal side-slip velocity and said estimated side-slip velocity to generate a side-slip control signal.

11. The system of claim 10 further comprising:
a yaw rate control module, wherein said command interpreter generates an optimal yaw rate of said vehicle based on said position and said speed and wherein said yaw rate control module compares said optimal yaw rate and a measured yaw rate of said vehicle to generate a yaw control signal; and
a summing module that sums said yaw control signal and said side-slip control signal to generate an actuator control signal.

12. The system of claim 11 wherein at least one brake actuator of said vehicle applies a brake pressure difference across at least one axle of said vehicle to create a yaw moment that corrects a dynamic behavior of said vehicle based on said actuator control signal.

13. A vehicle stability enhancement control system, comprising:
a side-slip velocity estimation module that includes:
a side-slip acceleration estimation module that estimates a side-slip acceleration of a vehicle; and
a multiple-order integrator that integrates said side-slip acceleration to generate an estimated side-slip velocity of said vehicle;

a command interpreter that generates an optimal side-slip velocity and an optimal yaw rate of said vehicle;

a side-slip velocity control module that compares said optimal side-slip velocity and said estimated side-slip velocity to generate a side-slip control signal;

a yaw rate control module that compares said optimal yaw rate and a measured yaw rate of said vehicle to generate a yaw control signal; and a summing module that sums said yaw control signal and said side-slip control signal to generate an actuator control signal, wherein a rear-wheel steering actuator turns a set of rear wheels of said vehicle to create a yaw moment that corrects a dynamic behavior of said vehicle based on said actuator control signal.

14. A method for estimating a side-slip velocity of a vehicle in a vehicle stability enhancement control system, comprising:

estimating a side-slip acceleration of a vehicle;

integrating said side-slip acceleration to generate an estimated side-slip velocity of said vehicle, wherein a multiple-order integrator intergrates said side-slip acceleration; and clearing an output of said multiple-order integrator when a first condition occurs.

15. The method of claim 14 further comprising estimating said side-slip acceleration based on a yaw rate, a lateral acceleration, and a speed of said vehicle.

16. The method of claim 14 further comprising clearing said output when said vehicle experiences a straight-driving condition.

17. The method of claim 16 further comprising detecting said straight-driving condition based on a yaw rate, a lateral acceleration, and an angle of a steering wheel of said vehicle.

18. The method of claim 14 further comprising clearing said output when a speed of said vehicle is less than a predetermined speed.

19. The method of claim 14 further comprising clearing said output when a speed of said vehicle is greater than a predetermined speed, said vehicle does not experience a straight-driving condition, and said side-slip acceleration is less than a predetermined side-slip acceleration for a predetermined time period.

20. The method of claim 14 wherein said multiple-order integrator includes at least two accumulators and at least two feedback loops.

21. The method of claim 20 wherein said estimated side-slip velocity is a weighted sum of outputs of at least one of said at least two accumulators.

22. The method of claim 20 further comprising:

summing said at least two feedback loops to generate a feedback sum; and offsetting said estimated side-slip acceleration with said feedback sum.

23. The method of claim 14 further comprising:

generating an optimal side-slip velocity of said vehicle based on a position of a steering wheel of said vehicle and a speed of said vehicle; and comparing said optimal side-slip velocity and said estimated side-slip velocity to generate a side-slip control signal.

24. The method of claim 23 further comprising:

generating an optimal yaw rate of said vehicle based on said position and said speed;

comparing said optimal yaw rate and a measured yaw rate of said vehicle to generate a yaw control signal; and summing said yaw control signal and said side-slip control signal to generate an actuator control signal.

25. The method of claim 24 further comprising applying a brake pressure difference across at least one axle of said vehicle to create a yaw moment that corrects a dynamic behavior of said vehicle based on said actuator control signal.

26. A method for operating a vehicle stability enhancement control system, comprising:

estimating a side-slip acceleration of a vehicle;

integrating said side-slip acceleration to generate an estimated side-slip velocity of said vehicle, wherein a multiple-order integrator integrates said side-slip acceleration;

generating an optimal side-slip velocity and an optimal yaw rate of said vehicle;

comparing said optimal side-slip velocity and said estimated side-slip velocity to generate a side-slip control signal;

comparing said optimal yaw rate and a measured yaw rate of said vehicle to generate a yaw control signal;

summing said yaw control signal and said side-slip control signal to generate an actuator control signal; and turning a set of rear wheels of said vehicle to create a yaw moment that corrects a dynamic behavior of said vehicle based on said actuator control signal.

* * * * *